(12) United States Patent  (10) Patent No.: US 9,118,655 B1
Paczkowski et al.  (45) Date of Patent: Aug. 25, 2015

(54) TRUSTED DISPLAY AND TRANSMISSION OF DIGITAL TICKET DOCUMENTATION

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/163,047

(22) Filed: Jan. 24, 2014

(51) Int. Cl.
  *H04L 29/02* (2006.01)
  *H04L 29/06* (2006.01)

(52) U.S. Cl.
  CPC .................. *H04L 63/0807* (2013.01)

(58) Field of Classification Search
  CPC . H04L 63/0807; H04L 63/0428; H04L 63/08; H04L 63/0853; G06F 21/6218; G06Q 20/3278
  USPC ....................................................... 726/7–20
  See application file for complete search history.

(56) References Cited

U.S. PATENT DOCUMENTS

| 5,303,378 | A | 4/1994 | Cohen |
| 5,321,735 | A | 6/1994 | Breeden et al. |
| 5,796,952 | A | 8/1998 | Davis et al. |
| 6,131,024 | A | 10/2000 | Boltz |
| 6,177,860 | B1 | 1/2001 | Cromer et al. |
| 6,219,712 | B1 | 4/2001 | Mann et al. |
| 6,363,150 | B1 | 3/2002 | Bhagavath et al. |
| 6,477,180 | B1 | 11/2002 | Aggarwal et al. |
| 6,614,893 | B1 | 9/2003 | Paiz |
| 6,668,322 | B1 | 12/2003 | Wood et al. |
| 6,691,230 | B1 | 2/2004 | Bardon |
| 6,754,784 | B1 | 6/2004 | North et al. |
| 6,823,454 | B1 | 11/2004 | Hind et al. |
| 6,824,064 | B2 | 11/2004 | Guthery et al. |

(Continued)

FOREIGN PATENT DOCUMENTS

| WO | WO2011025433 A1 | 3/2011 |
| WO | 2013170228 A2 | 11/2013 |

(Continued)

OTHER PUBLICATIONS

FAIPP Pre-Interview Communication dated Mar. 20, 2014, U.S. Appl. No. 13/482,731, filed May 29, 2012.

(Continued)

*Primary Examiner* — Catherine Thiaw

(57) ABSTRACT

Embodiments of the disclosure relate generally to methods and systems for transmitting and displaying digital ticket documentation. A mobile communication device may comprise one or more keys that are specific for the device, wherein the keys are stored in a trusted security zone on the mobile device. In some embodiments, the keys may be associated with a specific ticket provider. The keys may be used to processes one or more datasets received from a ticket provider, wherein processing the dataset(s) may generate a digital ticket. The ticket may be generated and stored in the trusted security zone of the mobile device. The mobile device may be operable to present the ticket via the user interface of the mobile device and/or a near field communication transceiver of the mobile device.

20 Claims, 7 Drawing Sheets

(56) References Cited

U.S. PATENT DOCUMENTS

| | | |
|---|---|---|
| 6,895,234 B1 | 5/2005 | Laursen et al. |
| 7,366,806 B2 | 4/2008 | Milenkovic et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,650,645 B1 | 1/2010 | Langendorf et al. |
| 7,716,720 B1 | 5/2010 | Marek et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 2002/0035697 A1* | 3/2002 | McCurdy et al. ............. 713/200 |
| 2002/0091569 A1 | 7/2002 | Kitaura et al. |
| 2002/0098389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0093667 A1* | 5/2003 | Dutta et al. .................. 713/161 |
| 2003/0110046 A1* | 6/2003 | Cofta ............................... 705/1 |
| 2003/0126225 A1 | 7/2003 | Camble et al. |
| 2003/0172163 A1 | 9/2003 | Fujita et al. |
| 2003/0229514 A2 | 12/2003 | Brown |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0052994 A1 | 3/2005 | Lee |
| 2005/0091505 A1 | 4/2005 | Riley et al. |
| 2005/0138433 A1 | 6/2005 | Linetsky |
| 2005/0181796 A1 | 8/2005 | Kumar et al. |
| 2005/0235166 A1 | 10/2005 | England et al. |
| 2005/0239481 A1 | 10/2005 | Seligmann |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0156026 A1 | 7/2006 | Utin |
| 2006/0164978 A1 | 7/2006 | Werner et al. |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro, II |
| 2007/0143210 A1* | 6/2007 | Yeung et al. ..................... 705/50 |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1* | 8/2008 | Hammad et al. ................. 705/13 |
| 2008/0212503 A1 | 9/2008 | Lipford et al. |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1* | 3/2009 | Nystrom et al. ............. 455/41.1 |
| 2009/0089449 A1 | 4/2009 | Day |
| 2009/0113425 A1 | 4/2009 | Ports et al. |
| 2009/0144161 A1* | 6/2009 | Fisher ............................. 705/16 |
| 2009/0147958 A1 | 6/2009 | Calcaterra et al. |
| 2009/0154348 A1 | 6/2009 | Newman |
| 2009/0182605 A1 | 7/2009 | Lappas et al. |
| 2009/0182634 A1 | 7/2009 | Park et al. |
| 2009/0193491 A1 | 7/2009 | Rao |
| 2009/0248445 A1 | 10/2009 | Harnick |
| 2009/0271321 A1 | 10/2009 | Stafford |
| 2009/0281947 A1 | 11/2009 | Erel |

(56) References Cited

U.S. PATENT DOCUMENTS

| | | | |
|---|---|---|---|
| 2009/0300599 A1 | 12/2009 | Piotrowski | |
| 2009/0312011 A1* | 12/2009 | Huomo et al. | 455/426.1 |
| 2009/0320028 A1 | 12/2009 | Gellerich et al. | |
| 2010/0031325 A1 | 2/2010 | Maigne et al. | |
| 2010/0052844 A1 | 3/2010 | Wesby | |
| 2010/0077487 A1 | 3/2010 | Travis et al. | |
| 2010/0082977 A1 | 4/2010 | Boyle et al. | |
| 2010/0125904 A1 | 5/2010 | Nice et al. | |
| 2010/0128598 A1 | 5/2010 | Gandhewar et al. | |
| 2010/0130170 A1 | 5/2010 | Liu et al. | |
| 2010/0142517 A1 | 6/2010 | Montemurro et al. | |
| 2010/0146589 A1 | 6/2010 | Safa | |
| 2010/0153721 A1 | 6/2010 | Mellqvist | |
| 2010/0162028 A1 | 6/2010 | Frank et al. | |
| 2010/0190469 A1 | 7/2010 | Vanderveen et al. | |
| 2010/0198943 A1 | 8/2010 | Harrang et al. | |
| 2010/0217709 A1 | 8/2010 | Aabye et al. | |
| 2010/0223348 A1 | 9/2010 | Przybysz et al. | |
| 2010/0228937 A1 | 9/2010 | Bae et al. | |
| 2010/0241847 A1 | 9/2010 | van der Horst et al. | |
| 2010/0246818 A1 | 9/2010 | Yao | |
| 2010/0269156 A1 | 10/2010 | Hohlfeld et al. | |
| 2010/0274726 A1 | 10/2010 | Florek et al. | |
| 2010/0279653 A1 | 11/2010 | Poltorak | |
| 2010/0281139 A1 | 11/2010 | Deprun | |
| 2010/0291896 A1 | 11/2010 | Corda | |
| 2010/0299313 A1 | 11/2010 | Orsini et al. | |
| 2010/0306353 A1 | 12/2010 | Briscoe et al. | |
| 2010/0318802 A1 | 12/2010 | Balakrishnan | |
| 2010/0328064 A1 | 12/2010 | Rogel | |
| 2011/0010720 A1 | 1/2011 | Smith et al. | |
| 2011/0014948 A1 | 1/2011 | Yeh | |
| 2011/0021175 A1 | 1/2011 | Florek et al. | |
| 2011/0035604 A1 | 2/2011 | Habraken | |
| 2011/0050713 A1 | 3/2011 | McCrary et al. | |
| 2011/0055084 A1 | 3/2011 | Singh | |
| 2011/0063093 A1 | 3/2011 | Fung et al. | |
| 2011/0078081 A1 | 3/2011 | Pirzadeh et al. | |
| 2011/0082711 A1 | 4/2011 | Poeze et al. | |
| 2011/0112968 A1 | 5/2011 | Floreck et al. | |
| 2011/0113479 A1 | 5/2011 | Ganem | |
| 2011/0130635 A1 | 6/2011 | Ross | |
| 2011/0138064 A1 | 6/2011 | Rieger et al. | |
| 2011/0145926 A1 | 6/2011 | Dalcher et al. | |
| 2011/0154032 A1 | 6/2011 | Mauro, II | |
| 2011/0166883 A1 | 7/2011 | Palmer et al. | |
| 2011/0173090 A1 | 7/2011 | Miller et al. | |
| 2011/0202916 A1 | 8/2011 | VoBa et al. | |
| 2011/0212707 A1 | 9/2011 | Mahalal | |
| 2011/0216701 A1 | 9/2011 | Patel et al. | |
| 2011/0226853 A1 | 9/2011 | Soh et al. | |
| 2011/0237190 A1 | 9/2011 | Jolivet | |
| 2011/0238573 A1 | 9/2011 | Varadarajan | |
| 2011/0238992 A1 | 9/2011 | Jancula et al. | |
| 2011/0246609 A1 | 10/2011 | Kim | |
| 2011/0251892 A1 | 10/2011 | Laracey | |
| 2011/0258462 A1 | 10/2011 | Robertson et al. | |
| 2011/0276677 A1 | 11/2011 | Osuga et al. | |
| 2011/0281558 A1 | 11/2011 | Winter | |
| 2011/0294418 A1 | 12/2011 | Chen | |
| 2012/0003983 A1 | 1/2012 | Sherlock et al. | |
| 2012/0011572 A1 | 1/2012 | Chew et al. | |
| 2012/0021683 A1 | 1/2012 | Ma et al. | |
| 2012/0023583 A1 | 1/2012 | Sallam | |
| 2012/0028575 A1 | 2/2012 | Chen et al. | |
| 2012/0029997 A1 | 2/2012 | Khan et al. | |
| 2012/0036347 A1 | 2/2012 | Swanson et al. | |
| 2012/0040662 A1 | 2/2012 | Rahman et al. | |
| 2012/0052801 A1 | 3/2012 | Kulkarni | |
| 2012/0072481 A1 | 3/2012 | Nandlall et al. | |
| 2012/0072979 A1 | 3/2012 | Cha et al. | |
| 2012/0084211 A1 | 4/2012 | Petrov et al. | |
| 2012/0084438 A1 | 4/2012 | Raleigh et al. | |
| 2012/0084836 A1 | 4/2012 | Mahaffey et al. | |
| 2012/0089700 A1 | 4/2012 | Safruti et al. | |
| 2012/0102202 A1 | 4/2012 | Omar | |
| 2012/0115433 A1 | 5/2012 | Young et al. | |
| 2012/0123868 A1 | 5/2012 | Brudnicki et al. | |
| 2012/0130839 A1 | 5/2012 | Koh et al. | |
| 2012/0131178 A1 | 5/2012 | Zhu et al. | |
| 2012/0137117 A1 | 5/2012 | Bosch et al. | |
| 2012/0137119 A1 | 5/2012 | Doerr et al. | |
| 2012/0143703 A1 | 6/2012 | Wall et al. | |
| 2012/0147750 A1 | 6/2012 | Pelletier et al. | |
| 2012/0149327 A1 | 6/2012 | Raboisson et al. | |
| 2012/0150601 A1 | 6/2012 | Fisher | |
| 2012/0154413 A1 | 6/2012 | Kim et al. | |
| 2012/0158467 A1 | 6/2012 | Hammad et al. | |
| 2012/0159163 A1 | 6/2012 | von Behren et al. | |
| 2012/0159612 A1 | 6/2012 | Reisgies | |
| 2012/0163206 A1 | 6/2012 | Leung et al. | |
| 2012/0168494 A1 | 7/2012 | Kim | |
| 2012/0178365 A1 | 7/2012 | Katz et al. | |
| 2012/0178366 A1 | 7/2012 | Levy et al. | |
| 2012/0190332 A1 | 7/2012 | Charles | |
| 2012/0191536 A1 | 7/2012 | Chen et al. | |
| 2012/0196529 A1* | 8/2012 | Huomo et al. | 455/41.1 |
| 2012/0196586 A1 | 8/2012 | Grigg et al. | |
| 2012/0198519 A1 | 8/2012 | Parla et al. | |
| 2012/0202423 A1 | 8/2012 | Tiedemann et al. | |
| 2012/0207165 A1 | 8/2012 | Davis | |
| 2012/0226582 A1 | 9/2012 | Hammad | |
| 2012/0226772 A1 | 9/2012 | Grube et al. | |
| 2012/0238206 A1 | 9/2012 | Singh et al. | |
| 2012/0252480 A1 | 10/2012 | Krutt et al. | |
| 2012/0255016 A1 | 10/2012 | Sallam | |
| 2012/0258690 A1 | 10/2012 | Chen et al. | |
| 2012/0259722 A1 | 10/2012 | Mikurak | |
| 2012/0266076 A1 | 10/2012 | Lockhart et al. | |
| 2012/0266220 A1 | 10/2012 | Brudnicki et al. | |
| 2012/0272306 A1 | 10/2012 | Benaloh et al. | |
| 2012/0282924 A1 | 11/2012 | Tagg et al. | |
| 2012/0284195 A1 | 11/2012 | McMillen et al. | |
| 2012/0291095 A1 | 11/2012 | Narendra et al. | |
| 2012/0295588 A1 | 11/2012 | Chen et al. | |
| 2012/0297187 A1 | 11/2012 | Paya et al. | |
| 2012/0303961 A1 | 11/2012 | Kean et al. | |
| 2012/0304286 A1 | 11/2012 | Croll et al. | |
| 2012/0309345 A1 | 12/2012 | Wake et al. | |
| 2012/0324293 A1 | 12/2012 | Grube et al. | |
| 2013/0014259 A1 | 1/2013 | Gribble et al. | |
| 2013/0034081 A1 | 2/2013 | Ban et al. | |
| 2013/0035056 A1 | 2/2013 | Prasad et al. | |
| 2013/0047197 A1 | 2/2013 | Saroiu et al. | |
| 2013/0054474 A1 | 2/2013 | Yeager | |
| 2013/0062417 A1 | 3/2013 | Lee et al. | |
| 2013/0067552 A1 | 3/2013 | Hawkes et al. | |
| 2013/0086385 A1 | 4/2013 | Poeluev | |
| 2013/0086684 A1 | 4/2013 | Mohler | |
| 2013/0097302 A9 | 4/2013 | Khedouri et al. | |
| 2013/0109307 A1 | 5/2013 | Reisgies et al. | |
| 2013/0111095 A1 | 5/2013 | Mehrotra et al. | |
| 2013/0117186 A1 | 5/2013 | Weinstein et al. | |
| 2013/0124583 A1 | 5/2013 | Ferguson et al. | |
| 2013/0125114 A1 | 5/2013 | Frascadore | |
| 2013/0136126 A1 | 5/2013 | Wang et al. | |
| 2013/0138521 A1 | 5/2013 | Want et al. | |
| 2013/0138959 A1 | 5/2013 | Pelly et al. | |
| 2013/0140360 A1 | 6/2013 | Graylin | |
| 2013/0143489 A1 | 6/2013 | Morris et al. | |
| 2013/0145429 A1 | 6/2013 | Mendel et al. | |
| 2013/0159186 A1 | 6/2013 | Brudnicki et al. | |
| 2013/0159710 A1 | 6/2013 | Khan | |
| 2013/0160120 A1 | 6/2013 | Malaviya et al. | |
| 2013/0174147 A1 | 7/2013 | Sahita et al. | |
| 2013/0191632 A1 | 7/2013 | Spector et al. | |
| 2013/0212704 A1 | 8/2013 | Shablygin et al. | |
| 2013/0262264 A1 | 10/2013 | Karstoft | |
| 2013/0263212 A1 | 10/2013 | Faltyn et al. | |
| 2013/0290709 A1 | 10/2013 | Muppidi et al. | |
| 2013/0305333 A1 | 11/2013 | Katzer et al. | |
| 2013/0310003 A1 | 11/2013 | Sadhvani et al. | |
| 2013/0332456 A1 | 12/2013 | Arkin | |
| 2013/0343181 A1 | 12/2013 | Stroud et al. | |

(56) References Cited

U.S. PATENT DOCUMENTS

| | | | |
|---|---|---|---|
| 2013/0345530 A1 | 12/2013 | McRoberts et al. | |
| 2013/0347103 A1 | 12/2013 | Veteikis et al. | |
| 2014/0047548 A1 | 2/2014 | Bye et al. | |
| 2014/0059642 A1 | 2/2014 | Deasy et al. | |
| 2014/0074508 A1 | 3/2014 | Ying et al. | |
| 2014/0089243 A1 | 3/2014 | Oppenheimer | |
| 2014/0089699 A1 | 3/2014 | O'Connor et al. | |
| 2014/0104287 A1 | 4/2014 | Nalluri et al. | |
| 2014/0106709 A1 | 4/2014 | Palamara et al. | |
| 2014/0155025 A1 | 6/2014 | Parker et al. | |
| 2014/0173747 A1 | 6/2014 | Govindaraju | |
| 2014/0188738 A1 | 7/2014 | Huxham | |
| 2014/0245444 A1 | 8/2014 | Lutas et al. | |
| 2014/0254381 A1 | 9/2014 | Racz et al. | |
| 2014/0267332 A1 | 9/2014 | Chhabra et al. | |
| 2014/0279558 A1* | 9/2014 | Kadi et al. | 705/71 |
| 2014/0281544 A1 | 9/2014 | Paczkowski et al. | |

FOREIGN PATENT DOCUMENTS

| | | | |
|---|---|---|---|
| WO | 2014004590 A2 | 1/2014 | |
| WO | 2014018575 A2 | 1/2014 | |
| WO | 2014025687 A2 | 2/2014 | |
| WO | WO2014158431 A1 | 10/2014 | |

OTHER PUBLICATIONS

Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13147729, filed on Jun. 25, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Search Report and Written Opinion, dated Apr. 22, 2014, PCT/US13/53617, filed on Aug. 5, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.

(56) References Cited

OTHER PUBLICATIONS

FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http://ieeexplore.ieee.org/stamp/stamp.jsp?tp=&arnumber=1617569.
Foreign Communication from a Related Counterpart—International Search Report and Written Opinion, dated Jul. 11, 2014, PCT/US14/16651, filed on Feb. 16, 2014.
Cope, Warren B., et al., "Electronic Purchase Transaction Trust Infrastructure", filed May 29, 2012, U.S. Appl. No. 13/482,731.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.

Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Trusted Security Zone Containers for the Protection and Confidentiality of Trusted Service Manager Data", filed Feb. 16, 2014, PCT Application No. PCT/US14/16651.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777 filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.

(56) References Cited

OTHER PUBLICATIONS

FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, U.S. Appl. No. 14/681,077.
Notice of Allowance dated May 29, 2015, U.S. Appl. No. 14/085,474, filed Nov. 20, 2013.

\* cited by examiner

TRUSTED DISPLAY AND TRANSMISSION OF DIGITAL TICKET DOCUMENTATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example media files, electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information. Confidential information may include multimedia content which may be communicated and stored on various devices. Confidential information may also include ticket rights and/or digital ticket documentation which may be stored on and present by a mobile communication device.

SUMMARY

In an embodiment, a method for transferring ticket documentation to a mobile communication device comprising a trusted security zone is disclosed. The method comprises: receiving a key to the mobile communication device that is specific for the device, wherein the key is stored in the trusted security zone; receiving a first dataset to the mobile communication device from a first ticket provider; processing the first dataset in the trusted security zone of the mobile communication device using the key to generate a first ticket; storing the ticket in the trusted security zone of the mobile communication device; and presenting the ticket using the mobile communication device.

In an embodiment, a method for transferring ticket documentation to a mobile communication device comprising a trusted security zone is disclosed. The method comprises: receiving one or more keys to the mobile communication device that are specific for the mobile communication device, wherein the keys are stored in the trusted security zone, and wherein each key is associated with a specific ticket provider; receiving a dataset to the mobile communication device from a first ticket provider; processing the dataset in the trusted security zone of the mobile communication device using the key associated with the first ticket provider to generate a ticket; storing the ticket in the trusted security zone of the mobile communication device; and presenting the ticket using the mobile communication device.

In an embodiment, a mobile communication device is disclosed. The device comprises: a processor, wherein a portion of the processor is controlled by a trusted security zone; a memory, wherein a portion of the memory is controlled by a trusted security zone; and a trust zone application stored in the memory, that when executed by the processor, receives a key to the mobile communication device that is specific for the mobile communication device, wherein the key is stored in the trusted security zone; receives a dataset to the mobile communication device from a first ticket provider; processes the dataset in the trusted security zone of the device using the key to generate a first ticket; stores the ticket in the trusted security zone of the mobile communication device; and presents the ticket using the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
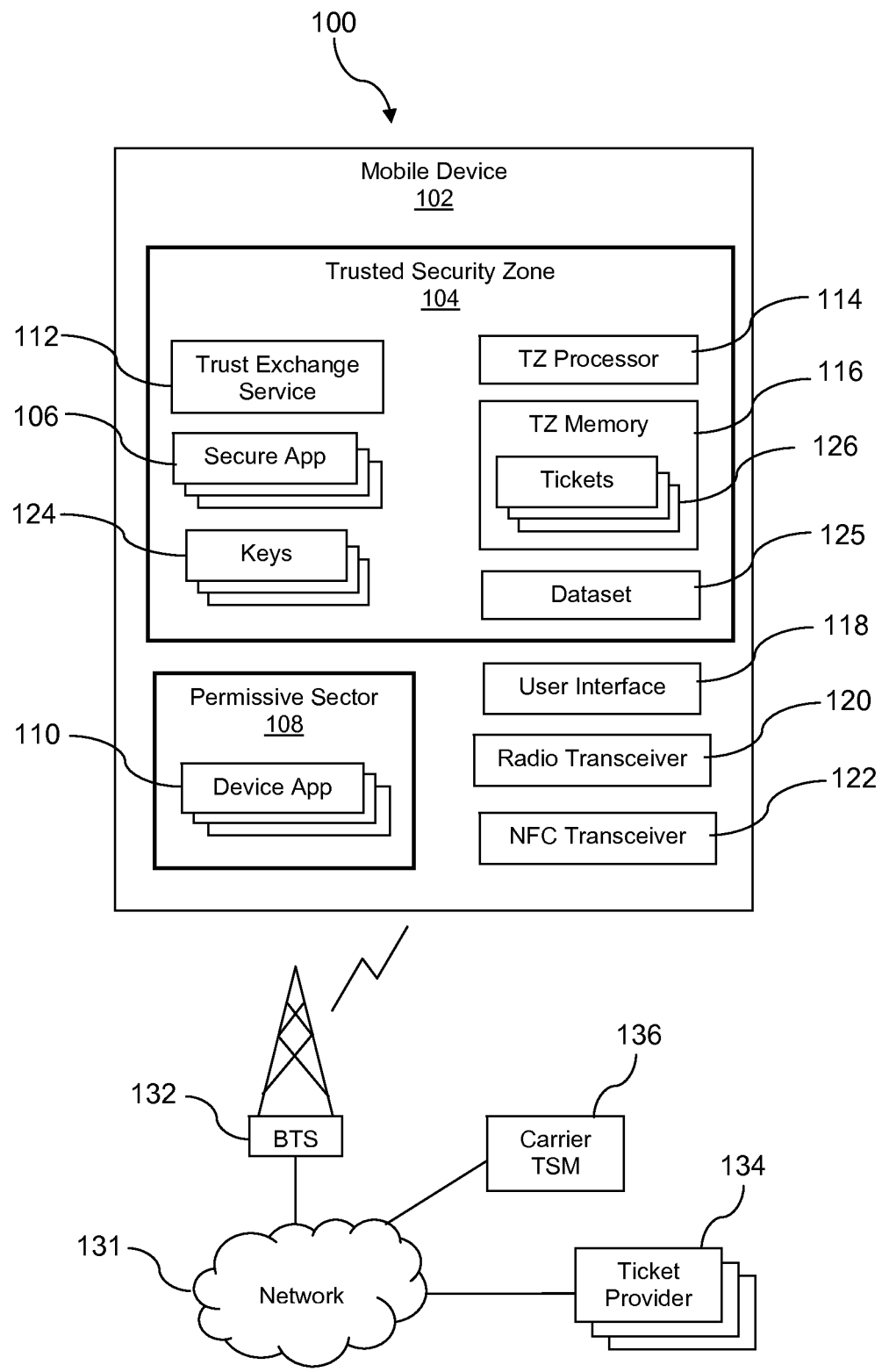
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for transferring ticket documentation to a mobile communication device comprising a trusted security zone. The ticket documentation may comprise an electronic ticket, for example ticket information in a digital format suitable for electronic and/or radio transmission, storing in a digital memory, and/or presenting on a display such as a computer screen or a display of a mobile communication device. The ticket documentation may be related to a ticket for boarding an airplane, for entering a sports event, for entering a concert event, for entering a movie theater, or other activity.

The mobile device may comprise a trust zone application stored and executed in the trusted security zone, where the application may be operable to receive and process digital ticketing documentation. In some cases, the mobile device may comprise one or more keys stored in the trusted security zone, where the keys may be specific for the device. Additionally, in some cases, the keys may be associated with a specific ticket provider. Ticket providers may communicate with the mobile device to transfer ticketing documentation. In some cases, the ticketing documentation may be transferred in an encrypted dataset from the ticket provider(s) to the mobile device. The encrypted dataset may be processed by the trust zone application to generate a digital ticket, which may be stored in the trusted security zone. In some cases, the encrypted dataset may be processed using the key(s) on the mobile device.

The encrypted dataset may be encrypted by the ticket provider such that the digital ticket may only be generated by a secure application on the mobile device if the correct key is used when the dataset is processed. In some cases, the ticket provider may encrypt the dataset using the key for the specific mobile device that is intended to receive the dataset. For example, a user may purchase a ticket from the ticket provider and provide information concerning the user's device. The ticket provider may encrypt the digital ticket using a key that is associated with the user's device. Then, the ticket provider may communicate the encrypted dataset to the mobile device. The encrypted dataset may be processed by an application in the trusted security zone of the mobile device using the key, which may be associated with the specific ticket provider. The processing of the dataset with the correct key may generate a ticket which may then be stored in the trusted security zone and later presented by the mobile device. In some cases, the ticket may be presented at a terminal to provide entrance for the user, such as for an airline, bus, train, concert, or other entertainment event. The ticket may comprise a Quick Response Code (QR code), or other image or barcode, which may be scanned to allow entrance for the user. In some cases, after the ticket is generated and stored in the trusted security zone of the mobile device, the ticket may be transferred from one mobile device to another mobile device, also comprising a trusted security zone.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the communication system 100 comprises a mobile device 102 comprising a trusted security zone 104, a permissive sector 108, a cellular radio transceiver 120, and a user interface 118. In an embodiment, the trusted security zone 104 comprises one or more secure applications 106. The permissive sector 108 may comprise one or more device applications 110. The mobile device 102 may engage in a variety of communication exchanges. The mobile device 102 may comprise a variety of devices such as a mobile phone, a personal digital assistant (PDA), a media player, a laptop computer, a tablet computer, and other electronic devices having a cellular radio transceiver. Some embodiments of the disclosure may also comprise stationary devices, such as a home entertainment system or other similar devices operable to present multimedia content. Such stationary devices may be coupled to a network 131 by either a wired communication link or a wireless communication link.

As described above, the trusted security zone 104 may be provided by a physically separate processor or by a virtual processor. The one or more secure applications 106 may be any of a variety of applications that process and/or transmit confidential information. The confidential information may comprise sensitive business documents such as electronic mail, marketing literature, business plans, client lists, addresses, employee data, intellectual property documents, and the like. The confidential information may comprise personal medical records or medical data that are subject to privacy requirements enforced by government regulatory bodies or commercial standards. The confidential information may comprise financial information such as account numbers, authentication identities, account balance information, and the like. Additionally, the confidential information may comprise ticketing documentation, for example, for an airline, rental company, hotel, concert, movie, and the like.

When processing and/or transmitting the confidential information, the secure application 106 executes at least partially in the trusted security zone 104. It is a characteristic or feature of the trusted security zone 104, as described more fully above, that when a secure application 106 executes in the trusted security zone 104, untrusted applications, such as device applications 110, are prevented from executing and/or accessing trusted memory partitions and/or accessing the display, communication interfaces, or input devices of the mobile device 102, thereby reducing the opportunity for malware that may have infiltrated the mobile device 102 to corrupt or to monitor the confidential information.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile device 102 may couple to the network 131 by a variety of communication paths. The mobile device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. The wireless link between the mobile device 102 and the base transceiver station 132 may couple the mobile device 102 to the network 131.

In an embodiment, the trusted security zone 104 may be provided in a secure area of a processor and/or memory chip shared with the permissive sector 108 or in a separate processor and/or memory chip. In some embodiments, the secure area may be represented by a trust zone processor 114 and a trust zone memory 116. The trusted security zone 104 may be provided as what may be conceptualized as "invisible space." In an embodiment, at least some of the memory addresses occupied by the trusted security zone 104 may be inaccessible to device applications 110 executing out of permissive sector 108. This demarcation of accessible memory addresses versus inaccessible memory addresses may be provided by the operating system of the mobile device 102. In an embodiment, the trusted security zone 104 may encapsulate a trusted execution environment (TEE), for example conforming at least partially to the Global Platform 2.0 or later revision trusted execution environment standard. It is understood, however, that the trusted security zone 104 is contemplated to provide further functionality than that envisioned by the trusted execution environment standards.

In an embodiment, a trust exchange service 112 is provided in the trusted security zone 104. The trust exchange service 112 may be conceptualized as bridging between the permissive sector 108 and the trusted security zone 104. The trust exchange service 112 promotes secure interactions between the applications executing in the permissive sector 108 and applications executing in the trusted security zone 104. The security may be provided using one or more techniques. For example, the trust exchange service 112 may pause a plurality of execution threads when initiating an interaction with the trusted security zone 104, for example while handling a request for service from a secure application 106. This feature may reduce the opportunity that other threads may sniff or otherwise seek to intrude on the operation. For example, the trust exchange service 112 may impose a criteria that all communication between the permissive sector 108 and the trusted security zone 104 be conducted using data that is transformed according to protocols of the trusted security zone 104, for example using encryption and/or using hashing. The trust exchange service 112 may also hide address space in the trusted security zone 104 and/or make the address space inaccessible to the permissive sector 108 without the mediation of the trust exchange service 112.

The device applications 110 executed in the permissive sector 108 may be any of a variety of applications. One of the device applications 110 may be a telephone application that receives dialed digits and attempts to originate a voice call—for example a voice over IP (VoIP) call—to a called telephone. One of the device applications 110 may be a web browser application that requests content from the network 131, for example by sending out a hypertext transport protocol (HTTP) message embedding a universal reference locator (URL). One of the device applications 110 may be a media player that requests streaming media from the network 131. Many of the device applications 110 may depend upon communication service provided by an IMS network to deliver their functionality to an end user of the mobile device 102. One of the device applications 110 may comprise a mobile transaction interface, where a user may complete a purchase using the application, and secure information, such as credit card information, may be communicated through the application.

The user interface 118 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, or phone call audio) to a user of the mobile device 102. The microphone may receive voice and/or audio from a user and/or communicate audio to a user. In an embodiment, a user may utilize the user interface 118 to communicate with the mobile device 102, for example, to initiate the execution of a device application 110 and/or a secure application 106. Additionally, a user may receive communication from the mobile device 102 via the user interface 118, such as phone calls, text messages, messages, emails, contact information, caller identification, call history, internet access, etc. A user may additionally employ the user interface 118 for viewing and/or listening to media such as music, movies, shows, videos, photos, games etc.

In some embodiments, the mobile device 102 may be operable to store and present digital ticketing documentation. Ticketing documentation (or tickets) may comprise airline tickets, bus tickets, train tickets, rental information, hotel information, concert tickets, movie tickets, and the like. In some embodiments, ticketing documentation may also comprise coupons, discounts, rewards, etc. which may be used during a purchase. In some embodiments, the ticketing documentation may comprise an image, bar code, QR code, or something similar which may be presented by the display of the user interface 118. The image may then be recognized (or scanned) at a POS terminal. In other embodiments, the ticketing documentation may comprise an electronic file that may be presented via a near-field communication (NFC) transceiver 122 of the mobile device 102, wherein the mobile device 102 may communicate with a point-of-sale terminal (POS terminal) via NFC.

In some embodiments, the ticketing documentation may be downloaded to the mobile device 102 from one or more ticketing providers 134 via a connection with the mobile device 102 over the network 131. In some embodiments, the connection between the mobile device 102 and the ticket provider 134 may be facilitated by a carrier trusted service manager (or TSM) 136. The ticketing documentation may be an information package that may be processed by a trusted application 106 on the mobile device 102 to generate a ticket.

In some embodiments, the trusted security zone 104 of the mobile device 102 may comprise one or more keys 124 associated with the mobile device 102, wherein the key(s) 124 may be used to verify the identity of the mobile device 102 (or the user of the mobile device 102). Additionally, the key(s) 124 may be known by the ticketing provider(s) 134. For example, if a purchase or request is made by a user, the key 124 associated with that user (or the device 102 of that user) may be associated with the purchase or request by the ticket provider 134. Then, when the purchase or request is received by the mobile device 102, the key 124 on the mobile device 102 may verify that the purchase or request has been sent to the correct mobile device 102. In some embodiments, a user may create an account with a ticket provider 134, wherein identification information concerning the user and one or more devices belonging to the user may be communicated to the ticket provider 134. In some embodiments, this identification information may comprise the key(s) associated with the user's device(s).

In some embodiments, the mobile device 102 may communicate with the ticket provider(s) 134 and exchange the key 124 information. In some embodiments, the key 124 may be stored on the device 102 and communicated from the device 102 to the ticket provider 134. For example, the key may be stored on the mobile device 102 by the OEM at assembly or during activation of the mobile device 102. In other embodiments, the key 124 may be communicated from the ticket provider 134 to the mobile device 102, for example, when an account is created by the user of the mobile device 102. In yet another embodiment, the key 124 may be provided by the carrier TSM 136 that provides service the device 102, wherein the carrier TSM 136 may communicate the key 124 to both the device 102 and the ticket provider 134. In some embodiments, the key(s) 124 may be communicated between the mobile device 102 and the ticket provider 134 via a secure end-to-end connection.

In some embodiments, the mobile device 102 may comprise one key 124 that is specific for the device 102 and is known by all the ticket providers 134 that communicate with the device 102. In another embodiment, the mobile device 102 may comprise multiple keys 124, each specific for the device 102, wherein each key 124 may be associated with a different ticket provider 134.

In some embodiments, the ticketing documentation may be communicated to the mobile device 102 in the form of an encrypted dataset 125. The dataset 125 may be stored and processed by the trusted security zone 104 of the mobile device 102. In some embodiments, the dataset 125 may be encrypted using the key 124 associated with the device 102 it is intended for. In other words, the ticket provider 134 may use the key 124 to encrypt the dataset 125, such that if the dataset 125 is processed by a device 102 that does not have the correct key 124, the ticketing documentation within the dataset 125 may not be accessed. The dataset 125 may be processed by one of the secure applications 106 using the key 124, wherein a ticket 126 may be generated by processing the dataset 125 with the correct key 124. After the process of generating the tickets(s) 126 is completed, the ticket(s) 126 may be stored the in trust zone memory 116. The secure application 106 may be operable to process multiple datasets 125 using multiple keys 124 to generate and store multiple tickets 126.

One or more secure applications 106 may be operable to present the tickets 126 when requested by the user of the mobile device 102. For example, the application 106 may be operated by a user, wherein the user may request for a ticket 126 to be presented on the display of the mobile device 102. In another example, a user may request that the ticket 126 be made accessible via NFC, wherein the secure application 106 may access the NFC transceiver 122 of the mobile device 102. As described above, when a secure application 106 is presenting the ticket 126, external access to the display or NFC may be blocked by the trusted security zone 104.

In some embodiments, a ticket 126 may comprise a single use capability, such as an airline ticket or concert ticket, for example. In other embodiments, a ticket 126 may comprise multiple uses, such as a coupon, or a ticket comprising airline, rental, and hotel information, for example. In some embodiments, after a ticket 126 has been used (either once or multiple times), it may be deleted or removed from the trust zone memory 116. In another embodiment, a ticket 126 may have an expiration date and may be deleted or removed from the memory 116 at that point.

In some embodiments, after a ticket 126 has been generated from the dataset 125, it may be possible to transfer the ticket 126 to the trusted security zone 104 of another device. For example, a first user may purchase the ticket, download the dataset, and generate the ticket 126, but may wish to transfer the ticket to another user. In some embodiments, the ticket 126 may be transferred over a secure connection between the trusted security zones 104 of the devices.

Figure 2:
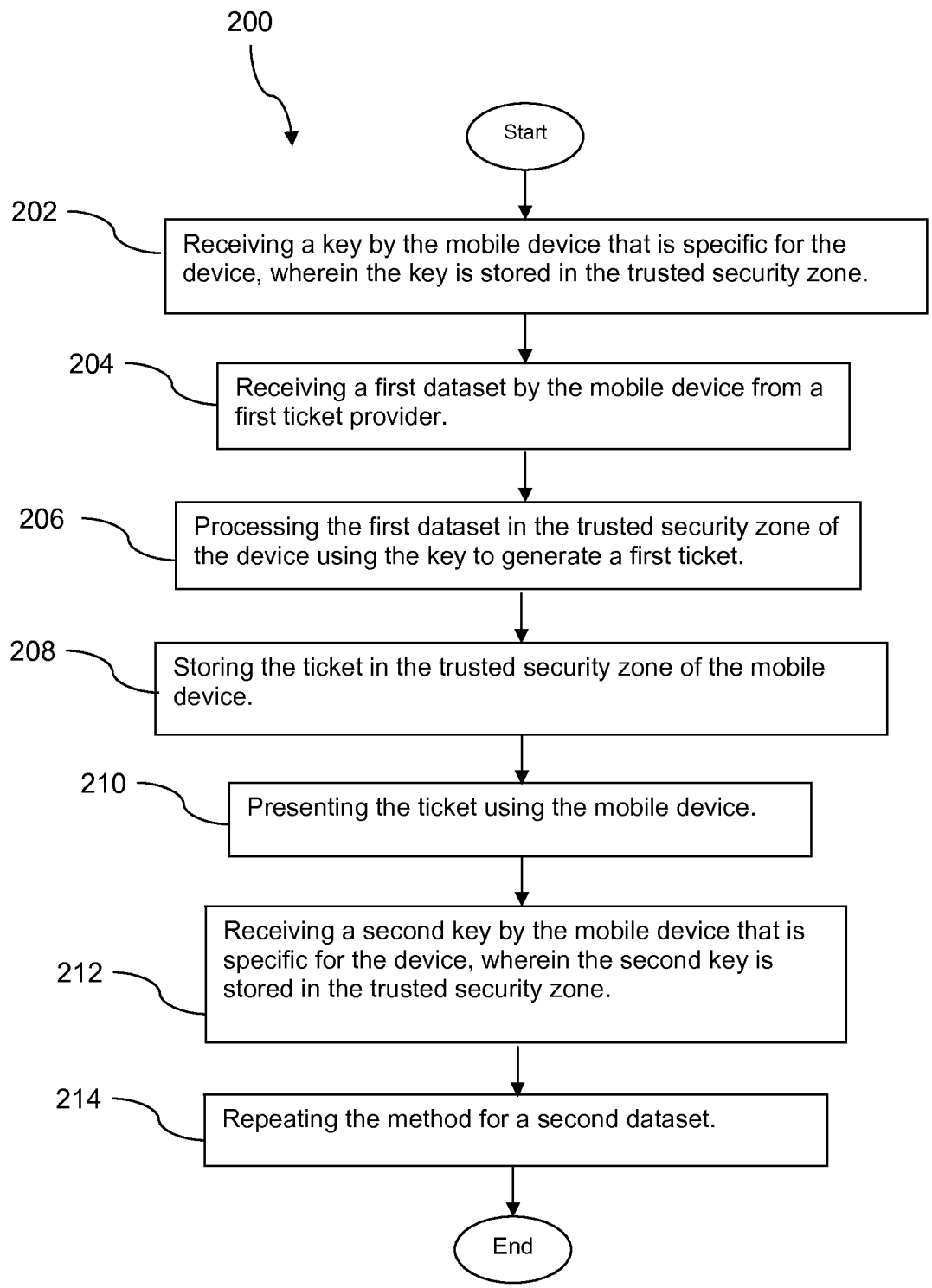
FIG. 2 is a flow chart illustrating a method according to an embodiment of the disclosure.

Turning now to FIG. 2, a method 200 for transferring ticket documentation to a mobile communication device comprising a trusted security zone is described. At block 202, a key may be received by the mobile communication device that is specific for the device, wherein the key is stored in the trusted security zone. The key may be received during the initial processing or activation of the device, or when an account is created with a ticket provider. At block 204, a first dataset may be received by the mobile communication device from a first ticket provider. At block 206, the first dataset may be processed in the trusted security zone of the mobile communication device using the key to generate a first ticket. At block 208, the ticket may be stored in the trusted security zone of the mobile communication device. At block 210, the ticket may be presented using the mobile communication device. At block 212, a second key may be received by the mobile device that is specific for the device, wherein the second key may be stored in the trusted security zone. The second key may be received during the initial processing or activation of the device, or when an account is created with a ticket provider. At block 214, the method may be repeated for a second dataset. This may comprise: receiving a second dataset to the mobile communication device from a second ticket provider; processing the second dataset in the trusted security zone of the mobile communication device using the key to generate a second ticket; storing the ticket in the trusted security zone of the mobile communication device; and presenting the ticket using the mobile communication device.

In some embodiments, processing and presenting may be completed by an application executed in the trusted security zone of the mobile communication device. In some embodiments, the key may be received over a trusted end-to-end communication link between the ticket provider and the mobile communication device. For further details on trusted end-to-end communication links see U.S. patent application Ser. No. 13/532,588, filed Jun. 25, 2012, titled "End-to-End Trusted Communications Infrastructure," by Leo Michael McRoberts, et al., which is hereby incorporated by reference in its entirety.

In some embodiments, presenting the ticket may comprise accessing the user interface of the mobile communication device. In some embodiments, presenting the ticket may comprise accessing a near-field communication transceiver of the mobile communication device. In some embodiments, the same key may be used to process both datasets. In some embodiments, the second key may be used to generate the second ticket. In some embodiments, the second key may be associated with the second ticket provider.

Figure 3:
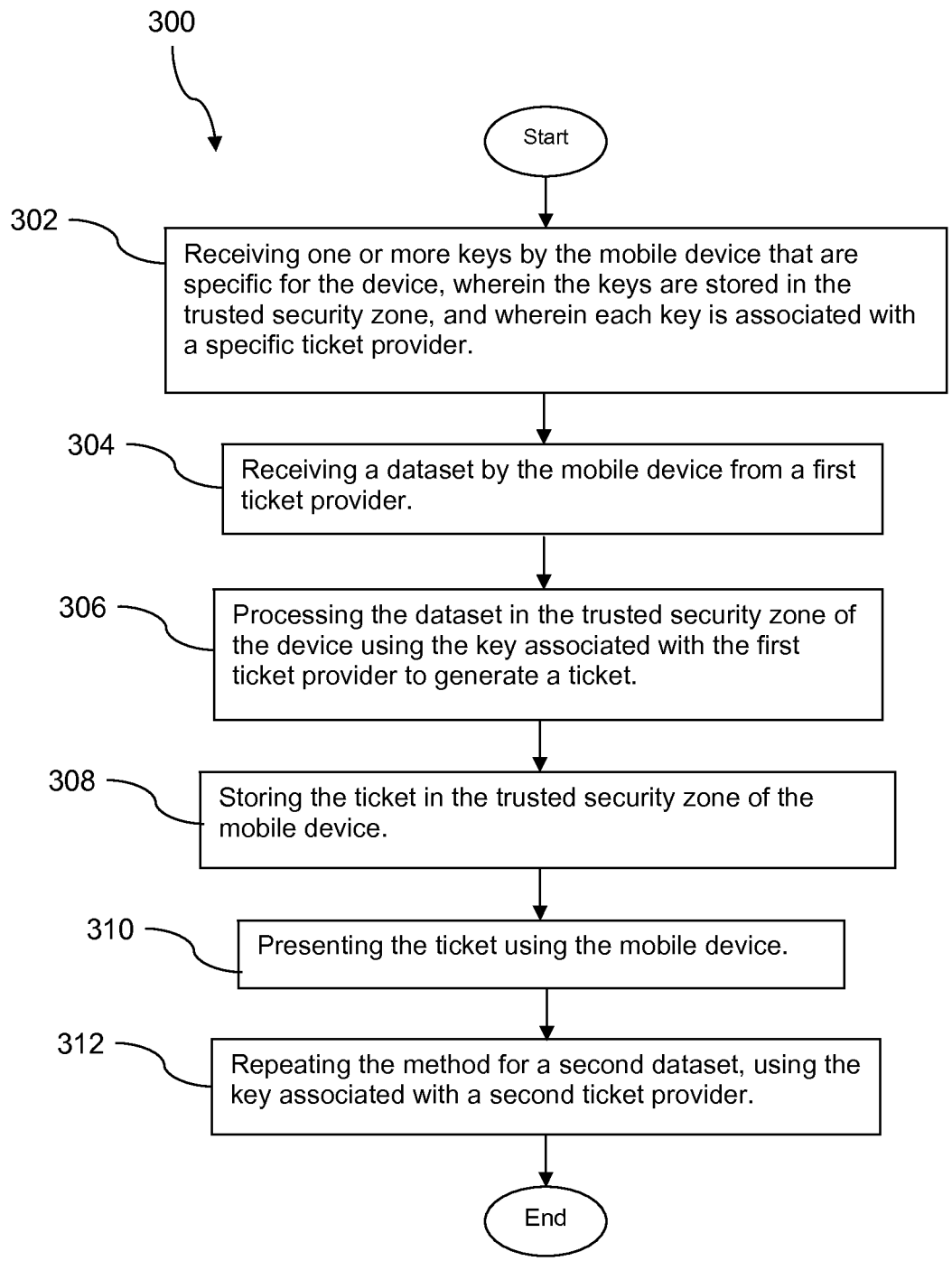
FIG. 3 is a flow chart illustrating another method according to an embodiment of the disclosure.

Turning now to FIG. 3, a method 300 for transferring ticket documentation to a mobile communication device comprising a trusted security zone is described. At block 302, one or more keys may be received by the mobile communication device that are specific for the mobile communication device, wherein the keys are stored in the trusted security zone, and wherein each key is associated with a specific ticket provider. At block 304, a dataset may be received by the mobile communication device from a first ticket provider. At block 306, the dataset may be processed in the trusted security zone of the mobile communication device using the key associated with the first ticket provider to generate a ticket. At block 308, the ticket may be stored in the trusted security zone of the mobile communication device. At block 310, the ticket may be presented using the mobile communication device. At block 312, the method may be repeated for a second dataset using the key associated with a second ticket provider. This step may comprise: receiving a dataset to the mobile communication device from a second ticket provider; processing the dataset in the trusted security zone of the mobile communication device using the key associated with the second ticket provider to generate a ticket; storing the ticket in the trusted security zone of the mobile communication device; and presenting the ticket using the mobile communication device. In some embodiments, the steps of the method may be completed by an application executed in the trusted security zone of the mobile communication device. In some embodiments, the keys may be received over a trusted end-to-end communication link between the ticket provider and the mobile communication device.

Figure 4:
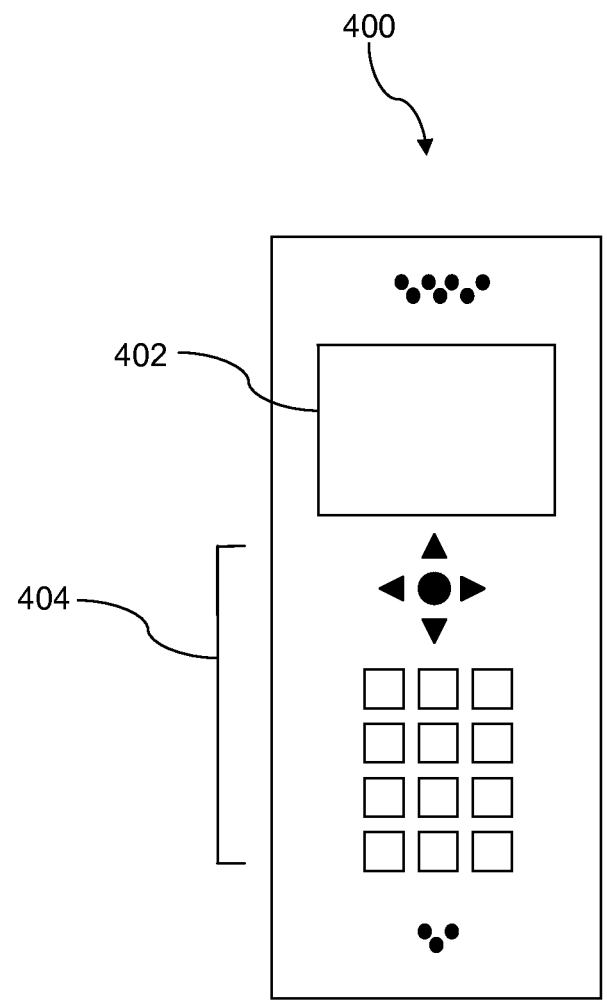
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
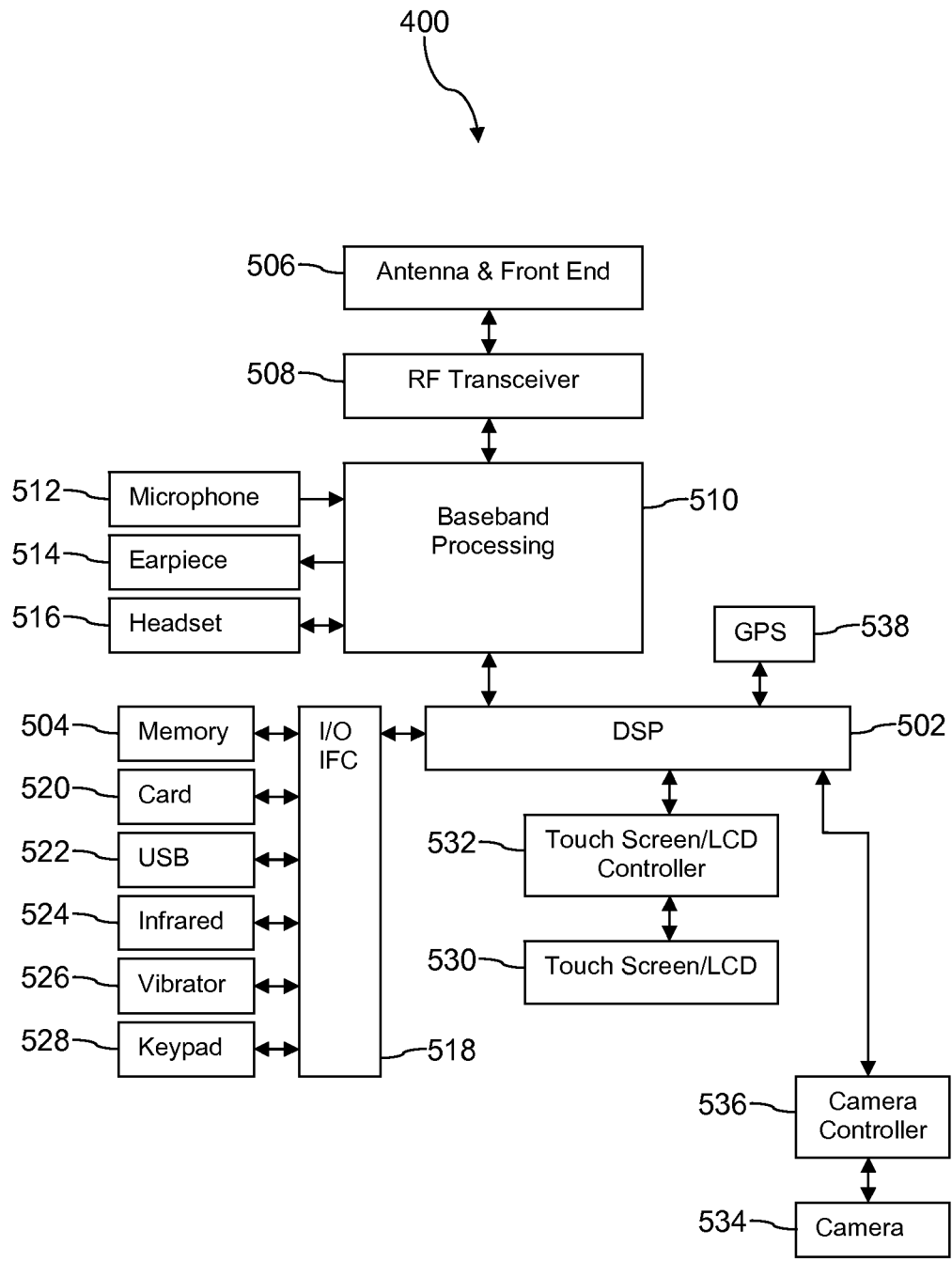
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
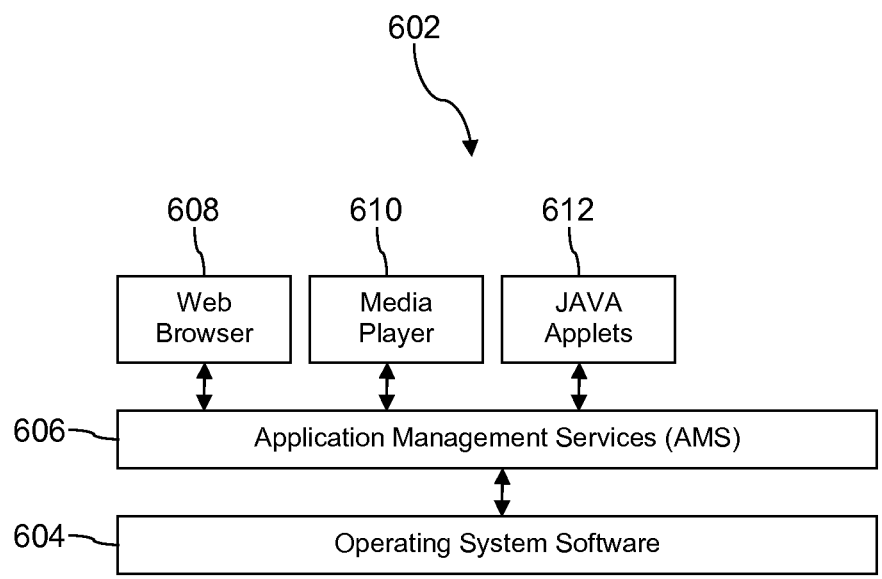
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
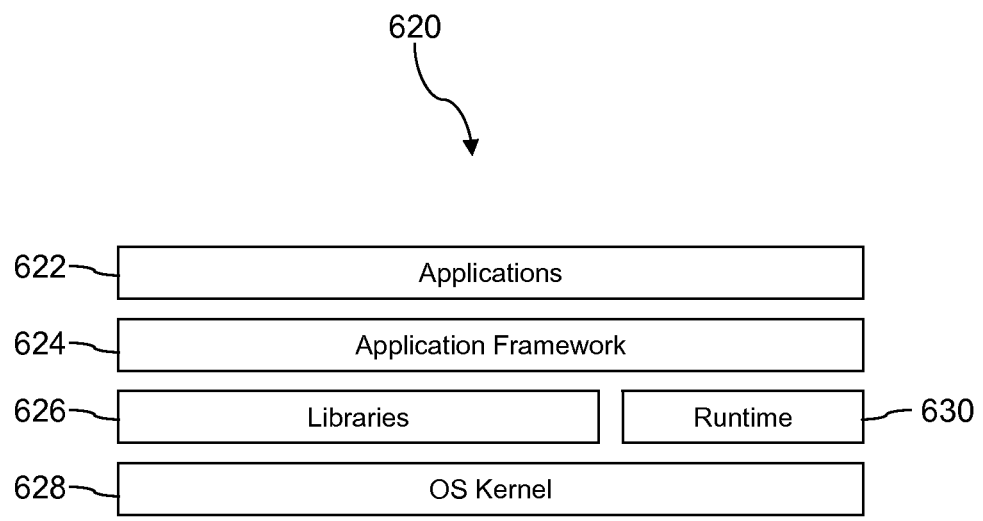
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
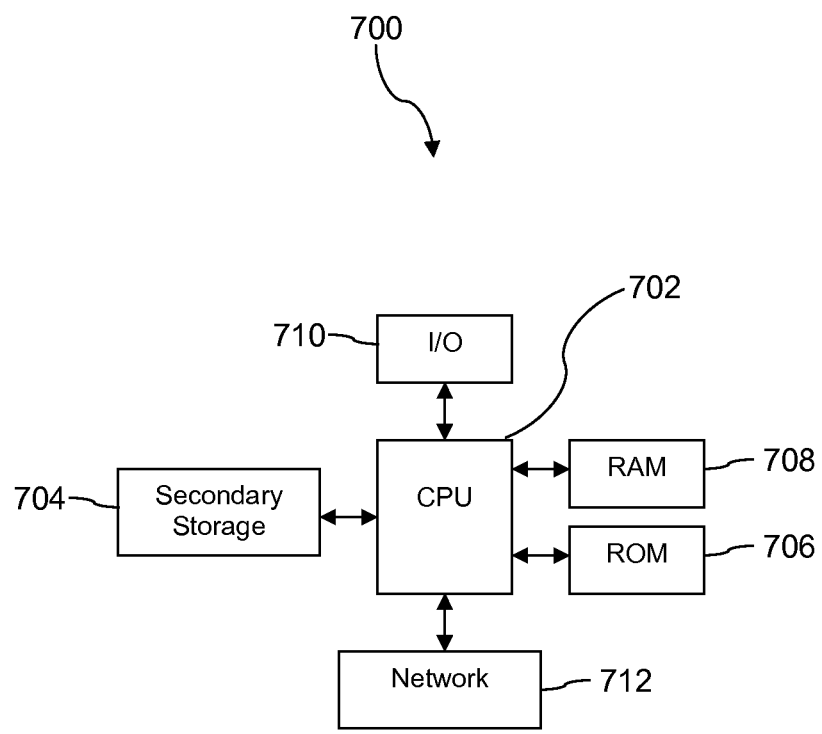
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for transferring ticket documentation to a mobile communication device comprising a trusted security zone, the method comprising:
   receiving, on the mobile communication device from a server at a ticket provider, a dataset and a key, wherein the key is from a carrier server executing a trusted service manager that provides the server at the ticket provider with the key, wherein the key triggers access and execution of the trusted security zone of the mobile communication device;
   processing, by the mobile communication device using the key for initiating execution of the trusted security zone of the mobile communication device, the dataset, wherein responsive to execution of the trusted security zone on the mobile communication device, applications configured to execute outside of the trusted security zone are prevented from executing on the mobile communication device;
   based on processing the dataset within the trusted security zone, generating, while executing at least one processor in the trusted security zone of the mobile communication device, a ticket associated with the ticket provider;
   storing the ticket in a secure memory portion in the trusted security zone of the mobile communication device; and
   responsive to the generating, presenting, by the mobile communication device executing the at least one processor in the trusted security zone of the mobile communication device, the ticket using a user interface while the trusted security zone blocks applications external to the trusted security zone from accessing the user interface of the mobile communication device.

2. The method of claim 1, wherein processing and presenting are completed by a secure application within the trusted security zone of the mobile communication device.

3. The method of claim 1, wherein the key is received via the server in communications with the carrier server over a trusted end-to-end communication link between the carrier server and the server at the ticket provider based on a request for the ticket to display on the mobile communication device.

4. The method of claim 1, wherein presenting the ticket disables wireless radios that execute outside of the trusted security zone of the mobile communication device.

5. The method of claim 1, further comprising accessing a near-field communication transceiver by an application executing within the trusted security zone of the mobile communication device while applications configured to execute outside of the trusted security zone are disabled from accessing the near-field communication transceiver.

6. The method of claim 5, further comprising receiving, by the mobile communication device, a second key that is specific to triggering execution of the trusted security zone for the device.

7. The method of claim 6, further comprising generating a second ticket within the trusted security zone based on processing the second dataset by using the second key to trigger execution of the trusted security zone.

8. The method of claim 6, wherein the second key is associated with the second ticket provider and specific to execution of the trusted security zone in the mobile communication device, the second key being provided by the carrier server.

9. The method of claim 1, further comprising:
   receiving, by the mobile communication device from a server at a second ticket provider, a second dataset coupled with a second key, the second key being provided via the second ticket provider obtaining the second key from the carrier server;
   based on the second key triggering execution of the trusted security zone, processing, within the trusted security zone of the mobile communication device, the second dataset to generate a second ticket;
   storing, while executing within the trusted security zone of the mobile communication device, the second ticket within the trusted security zone; and
   presenting, by the mobile communication device executing the corresponding trusted security zone, the ticket using the user interface of the mobile communication device while within the corresponding trusted security zone of the mobile communication device.

10. The method of claim 9, wherein the key and the second key are not given to the ticket provider or the second ticket provider by the mobile communication device.

11. A method for transferring ticket documentation to a mobile communication device comprising a trusted security zone, the method comprising:
    receiving, on the mobile communication device from a server at a ticket provider, a dataset and a key, wherein the key is specific to a trusted security zone of the mobile communication device, wherein the key is provided from a carrier server via the server at the ticket provider to associate the key with a specific ticket provider;

processing, by the mobile communication device using the key for executing in the trusted security zone, the dataset associated with the ticket provider, wherein responsive to execution of the trusted security zone on the mobile communication device, applications configured to execute outside of the trusted security zone are prevented from executing on the mobile communication device;

based on processing the dataset within the trusted security zone, generating a ticket while executing within the trusted security zone, wherein the ticket is associated with the ticket provider;

storing the ticket in a secure memory portion in the trusted security zone of the mobile communication device; and subsequent to storing the ticket in the secure memory portion of the trusted security zone, presenting, from the secure memory portion of the trusted security zone, the ticket using the trusted security zone of the mobile communication device.

12. The method of claim 11, further comprising:

receiving, on the mobile communication device, a second dataset and a second key from a server at a second ticket provider;

processing, on the mobile communication device, the second dataset in the trusted security zone of the mobile communication device by using the second key for execution of the trusted security zone;

storing the second dataset in the secure memory portion of the trusted security zone of the mobile communication device;

generating a second ticket within the trusted security zone of the mobile communication device based on the second dataset; and presenting, by the mobile communication device from the trusted security zone, the second ticket using the trusted security zone of the mobile communication device to prevent access to the ticket by any applications executing outside of the trusted security zone during presentation of the second ticket.

13. The method of claim 11, wherein the steps of the method are completed by at least one application executing in the trusted security zone of the mobile communication device.

14. The method of claim 11, wherein the key is received by the server at the ticket provider over a trusted end-to-end communication link from the carrier server associated with the mobile communication device.

15. A mobile communication device comprising:

at least one processor comprising a secure partition providing a hardware root of trust in a trusted security zone;

a non-transitory memory comprising a secure memory portion in the trusted security zone of the mobile communication device, wherein responsive to execution of the trusted security zone on the mobile communication device, applications configured to execute outside of the trusted security zone are prevented from executing on the mobile communication device; and a trust zone application stored in the secure memory portion in the trusted security zone, that upon execution within the trusted security zone of the at least one processor, receives, from a server at a ticket provider, a key and a dataset, wherein the key is from a carrier server executing a trusted service manager that provides the server at the ticket provider with the key that is specific for the mobile communication device, wherein the key triggers access and execution of the trusted security zone of the mobile communication device;

processes the dataset in the secure memory portion in the trusted security zone using the key to trigger execution of the trusted security zone;

generates a ticket in the trusted security zone based on the dataset;

stores the ticket in the secure memory portion of the trusted security zone; and subsequent to the generation of the ticket, presents the ticket using the trusted security zone of the mobile communication device to block access to the ticket from applications configured to execute outside of the trusted security zone.

16. The device of claim 15, further comprising a user interface within the trusted security zone, wherein the ticket is presented using the user interface while executing within the trusted security zone of the mobile communication device.

17. The device of claim 15, further comprising a near-field communication transceiver (NFC) within the trusted security zone of the mobile communication device, wherein the ticket is presented using the near-field communication transceiver by an application executing in the trusted security zone while blocking applications configured to execute outside of the trusted security zone from accessing the near-field communication transceiver on the mobile communication device.

18. The device of claim 15, wherein the key is received via a server at the ticket provider in communication with a carrier based on a request for the ticket to display on the mobile communication device.

19. The device of claim 15, wherein the dataset is received via a network in communication with the mobile communication device.

20. The device of claim 19, wherein the dataset is communicated over an unsecure connection between the mobile communication device and the ticket provider.

* * * * *